Oct. 10, 1967  R. F. SEYFRIED  3,346,712
AUTOMATIC TEMPERATURE CONTROL
Original Filed Sept. 26, 1961
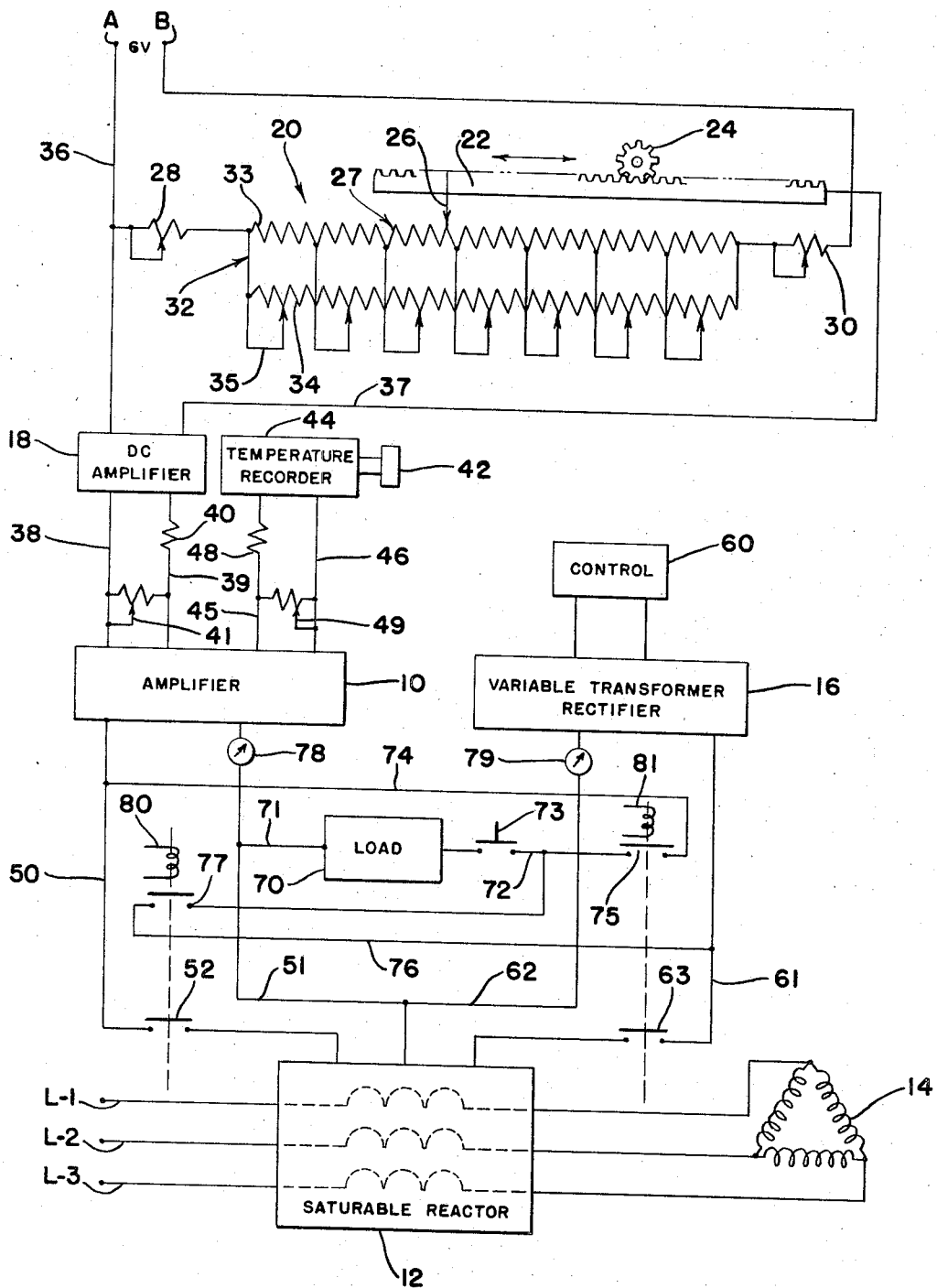
INVENTOR.
RICHARD F. SEYFRIED
BY
*Alfred C. Body*
ATTORNEY

United States Patent Office 3,346,712
Patented Oct. 10, 1967

3,346,712
AUTOMATIC TEMPERATURE CONTROL
Richard F. Seyfried, Parma Heights, Ohio, assignor to The Ohio Crankshaft Company, Cleveland, Ohio
Continuation of abandoned application Ser. No. 140,941, Sept. 26, 1961. This application Apr. 7, 1965, Ser. No. 448,566
10 Claims. (Cl. 219—8.5)

ABSTRACT OF THE DISCLOSURE

An automatic control for an induction heating tube mill of the type for welding strip metal into tubing wherein there is provided a device for controlling the amount of induction heating current as a non-linear function of the tube speed which is determined by a tachometer or a similar device.

---

This application is a continuing application of my co-pending application, Ser. No. 140,941, filed Sept. 26, 1961, now abandoned.

This invention relates to the art of electrical controls and more particularly to an automatic temperature control for a mill adapted to induction weld metal tubes.

This invention relates to an automatic temperature control for an induction heating mill for continuously welding metal tubes wherein the electrical power supplied to a welding inductor of the mill is controlled in accordance with the speed of the tube traveling through the mill and the temperature at the welding point to provide a substantially constant welding temperature. In the past, an automatic temperature control for a tube mill generally had only a temperature sensing device which would vary the power supplied to the inductor in accordance with the deviation of the welding temperature from a standard temperature. This type of automatic temperature control was not satisfactory because during initial operations of the mill the temperature sensing device would indicate a large power requirement which resulted in erratic operation of the welding inductor. During continuous operation of the mill, the temperature sensing type of automatic temperature control resulted in a substantial amount of hunting to further contribute to the dissatisfactory operation of such a control. To overcome these difficulties, the more recent automatic temperature controls for welding mills were provided with a workpiece or tube speed sensing device which would operate in conjunction with the usual temperature sensing device to control the power supplied to the inductor. Such an improved automatic temperature control usually comprised an oscillator to furnish current to the inductor, a saturable reactor connected to the plate transformer primaries of the oscillator, and a device for controlling the D.C. control voltage to the saturable reactor which device was controlled by both a speed sensing device and a temperature sensing device associated with the welding mill. Although such an automatic temperature control was an improvement over the automatic temperature control having only a temperature sensing device, it was still not completely satisfactory because the speed sensing device was not accurate enough to produce the proper variation in power to the inductor on changes in the tube speed. The prior speed sensing devices were constructed to produce a signal which was basically a linear function of the tube speed, i.e., the signal would double as the speed of the workpiece increased from 50 feet per second to 100 feet per second. The linear output of the speed sensing device did not produce the proper welding power response because a change in speed of the tube does not require a linear change of the power as is produced by such a linear speed sensing device. Even if the power requirement were a linear function of the speed, the linear speed sensing device would not control the power accurately because the electrical control components of the power control circuit, such as the saturable reactor and the oscillator, do not produce an output proportional to the speed signal input. Because of these non-linear aspects of the power control circuit and of the non-linear relation between tube speed and the power required for constant temperature at the welding point, a linear responsive speed sensing device would produce only an approximate control means; therefore, automatic temperature controls having both a speed and a temperature sensing device were primarily controlled by the temperature of the welding point and presented the same disadvantages found in the prior solely temperature responsive controls.

A continuous welding tube mill having an automatic temperature control must be frequently changed from the automatic temperature control to a manual temperature control. During operation of the automatic control, the current supplied to the inductor is continuously varying; therefore, the current does not correspond to the current produced by the manual control at the time of changeover. This mismatching of currents results in a defective welding joint during the change-over operation. The same difficulty is encountered when changing from a manual temperature control back to the automatic temperature control. During manual control of the current supplied to the inductor, the automatic control is continuously varying as if it were controlling the temperature of the welding point. Thus, the current output produced by the manual control and the current output produced by the automatic control may be substantially different and a change-over will produce a defective welding joint.

The present invention overcomes the difficulties found in prior automatic controls for welding mills and provides an automatic temperature control controlled by the speed of the tube and the temperature of the welding point wherein the non-linearity of the speed with respect to the power requirements is accurately compensated for so that the speed of the tube can have primary control of the power supplied to the inductor while the temperature at the welding point has only a slight effect on the power supplied to the welding inductor. This slight effect is approximately 10% of the total control over the power supplied to the inductor and is used to trim the power. Also, this invention allows a changeover from manual to automatic control and vice versa without substantially changing the current supplied to the inductor.

In accordance with the present invention, there is provided a non-linear sensing device adapted for use as a speed sensing device in an automatic temperature control for an induction welding apparatus comprised of a standard voltage imposed between the first and second ends of a first electric resistance member, a second member movable along the first member, a plurality of voltage control means spaced along the length of the first member to control the voltage drop per length of the first member so the electrical signal received by the second member varies non-linearly as the second member shifts along the first member.

Further in accordance with the present invention, there is provided a novel device for changing from an automatic temperature control to a manual temperature control for an induction heating apparatus comprised of a power control device, a load having an impedance equal to the impedance of the power control device, a means for connecting the load to the manual temperature control while it is disconnected from the power control device, means to adjust the output of the manual temperature control to the output of the automatic temperature control, and means for connecting the manual temperature control to the power control device as the automatic control system is disconnected therefrom. The same device is used for changing from a manual temperature control to an automatic temperature control.

The primary object of the present invention is to provide an automatic temperature control adapted to control the temperature at the welding point of a welding mill for continuously welding tubes which control is responsive to the speed of the workpiece and the temperature of the welding point and which control is primarily responsive to the speed of the workpiece.

A further object of this invention is the provision of a non-linear compensating workpiece speed sensing device for an automatic temperature control adapted to be used in a continuous welding tube mill which device provides uniform temperature at the welding point over the complete range of tube speeds.

Another object of this invention is to provide an automatic temperature control for a continuous welding tube mill wherein a non-linear compensating workpiece speed sensing device controls the power to the inductor.

A still further object of this invention is to provide an automatic temperature control for an induction heating apparatus wherein a non-linear compensating workpiece speed sensing device comprising a voltage divider or electric resistance member having a variable shunts along its length which controls the power to the inductor in accordance with the speed of the workpiece.

A further object of the present invention is to provide a device for converting linear movement into a predetermined non-linear electrical signal.

Still a further object of this invention is to provide in a continuous welding tube mill a device for changing from an automatic temperature control to a manual temperature control or vice versa without variations in the power supplied to the welding point.

Another object of this invention is to provide in a continuous welding tube mill a device for changing from an automatic temperature control to a manual temperature control or vice versa by connecting a load simulating the impedance of a saturable reactor selectively controlled by either the automatic control or the manual control.

This and other objects and advantages will become apparent from the following description used to illustrate the preferred embodiment of the invention as read in connection with the accompanying drawing in which:

The figure is a schematic and diagrammatic view illustrating the preferred embodiment of the present invention.

Referring now to the drawing wherein the showing is for the purpose of illustrating a preferred embodiment of the invention only and not for limiting same, there is disclosed a temperature control for controlling the temperature at the welding point of a continuous welding tube mill. The term "welding point" indicates the point at which the weld joint is produced. Although the invention will be described in connection with such a welding apparatus, it is not intended to limit the invention thereto, since the invention has broader applications and could be used in various induction heating apparatus or in any control circuit where speed controls an electrical output. Basically, the temperature control consists of an automatic temperature control and a manual temperature control selectively connected by a switching arrangement to control the power input of an inductor which induces current into a metal tube to be welded. The inductor and the tube welding apparatus may be any of a variety commonly used; therefore, no particular structure is disclosed. In essence, the automatic temperature control comprises an amplifier 10 having a DC output controlled by the speed of the tube and the temperature at the welding point of the tube which output is connected to the usual DC control windings of a saturable reactor 12. Three phase power lines L-1, L-2 and L-3 pass through the saturable reactor in the known manner and terminate at the plate transformer primary 14 of an oscillator which controls the power to the welding inductor. As the DC output of the amplifier 10 varies with changes in the speed of the tube and the temperature at the welding point, the power output of the oscillator is varied accordingly.

The manual temperature control is comprised of an adjustable voltage transformer and a rectifier both of which are designated as 16. The transformer and rectifier may be of any suitable construction; however, a full wave bridge silicone rectifier has proven satisfactory. The DC output from the rectifier is directed to the DC control windings of the saturable reactor to vary the output of the oscillator in the same manner as the automatic temperature control varies the output of the oscillator. The automatic temperature control and the manual temperature control are adapted to be selectively connected with the saturable reactor to control the power output of the oscillator automatically or manually as desired.

Referring more particularly to the automatic temperature control, the amplifier 10 has the basic function of producing an output proportional to variations in the speed of the tube and the temperature of the welding point; therefore, a variety of electrical components could be used at this position in the control, although a magnetic amplifier has proven satisfactory. An amplifier 18 directs a signal to amplifier 10 which signal varies according to the speed of the tube. The signal received by the amplifier 18 is provided by a non-linear compensating workpiece or tube speed sensing device 20 having a pickup bar or other member 22 movable in response to a change in speed of the tube as it passes through the welding mill. For purposes of illustration only, a tachmometer 24 engages the pickup bar 22 and moves the bar longitudinally to a position corresponding to the speed of the tube. Affixed to the bar 22 is a contact 26 which contacts a voltage divider 27 to present a given voltage to contact 26, which voltage varies as the speed of the tube varies the position of bar 22. The ends of the voltage divider 27 are connected to points A and B respectively which points present a standard DC voltage potential, preferably 6 volts. A potentiometer 28 is connected in series with the voltage divider 27 and provides a biasing voltage so that as the pickup bar moves completely across the voltage divider to the left as shown in the figure, i.e., to a zero speed position, there will be a predetermined voltage directed to amplifier 18. A similar potentiometer 30 is positioned at the opposite end of the voltage divider 27 to adjust the voltage directed to amplifier 18 as the bar 22 moves to the right end of the voltage divider, at which position the tube is passing through the welding mill at its maximum speed. The voltage along the divider 27 between point A and B contact 26 is directed through lines 36 and 37 to the input side of amplifier 18. The amplitude of this voltage is determined by the position of contact 26 which position corresponds to the speed of the tube through the welding mill.

As has been thus far explained, the voltage impressed on the input side of amplifier 18 would be a linear function of the speed of the tube. However, due to the non-linearity between the speed of the tube and the power required by the inductor to maintain a constant temperature at the welding point and the non-linearity of the electrical components of the control, the voltage directed to the input side of amplifier 18 must be a predetermined non-linear function of the tube speed, which non-linear function is obtained by controlling the voltage pattern along the length of divider 27. In the preferred embodiment of this invention, the voltage divider 27 is divided into a plurality of sections 33 each having a shunt circuit 32 provided with a shunt leg 34 and a movable control arm 35. Any number of sections 33 may be provided along the voltage divider 27 and the greater the number of such sections, the more accurately the output signal of the non-linear compensating speed sensing device 20 may be controlled. Other means could be used to vary the voltage per length of the divider 27. The control device may be used in other applications where an output signal is varied in a predetermined non-linear manner with respect to the linear movement of a member. Broadly, the device comprises a first member 27 having a controlled voltage pattern along its length and a second member that receives a non-linear signal from the first member as it moves linearly along the first member. The controlled voltage pattern is basically a variation of the voltage drop per length of the divider 27.

In operation, the arms 35 are adjusted along shunt legs 34 in the individual shunt circuits so that the voltage picked up by contact 26 will vary non-linearly as the speed of the tube varies. The voltage between contact 26 and point A will be such that the power supplied to the inductor will produce a constant temperature at the welding point.

The DC output of amplifier 18 is connected to the input of amplifier 10 through lines 38 and 39. To control the magnitude of the input through amplifier 10, it is possible to provide a control resistance 40. A speed authority potentiometer 41 is connected between lines 38 and 39 so that variations in the setting of this potentiometer will determine to what extent the amplifier 10 is controlled by the speed signal from amplifier 18.

A temperature pickup 42 located close to the welding point causes temperature recorder 44 to have an output signal proportional to the difference between the observed temperature and the required temperature at the welding point. The output of the temperature recorder is directed by lines 45, 46 to the input side of amplifier 10. Line 45 is provided with a resistor 48 similar to 40 in line 39. Between lines 45 and 46 is a temperature authority potentiometer 49 which determines to what extent the temperature sensing device controls the output of the amplifier 10.

The amplifier 10 is connected by lines 50 and 51 to the DC control winding of saturable reactor 12. The switch 52 in line 50 is closed when the automatic temperature control is in operation.

In essence, the automatic temperature control comprises an amplifier 10 which controls the saturable reactor and which amplifier has an input control signal from both a temperature responsive device, such as temperature recorder 44, and a speed responsive device, such as amplifier 18. By variations in the setting of authority potentiometers 41 and 49, the percentage of control by both the speed of the tube and the temperature of the welding point may be changed. By the use of the novel non-linear compensating speed sensing device, the accuracy by which the power is controlled by the speed of the tube is such that this control device may have primary authority over amplifier 10. Thus, in the preferred operation the speed responsive signal to amplifier 10 provides approximately 90% of the input signal to the amplifier while the temperature responsive signal provides only 10%, which is adequate to provide a fine trim on the output signal from the amplifier 10. By using the speed sensing device for the primary control, the disadvantages of the solely temperature responsive control are eliminated.

Now referring to the manual temperature control, a manually operated control 60 is connected to a variable transformer and full wave rectifier assembly 12. The output from the rectifier is directed through lines 61, 62 to the DC control windings of saturable reactor 12. Lines 51 and 62 are joined and it is possible to join line 61 to line 52 from the amplifier 10. A switch 63 is provided in line 61 to actuate the manual control.

When a change from the automatic temperature control to manual temperature control or vice versa is desired, it is necessary to provide the identical current output of the oscillator so that the change from one control to the other will not affect the welded joint. To accomplish this, the control current in the DC control windings of the saturable reactor must be substantially the same before and after the change-over. A device is provided for accomplishing this matching of the current output and it is comprised of a load 70 having an impedance substantially identical to the impedance of the DC winding within the saturable reactor. By connecting either control to the load 70, the control will function as if it were connected to the saturable reactor 12. Load 70 is connected by line 71 to line 51 and to lines 50 and 61 by lines 74 and 76 respectively. Lines 74 and 76 are connected by lines 72 to load 70 and a switch 73 is positioned in line 72. A solenoid 81 controls switch 76 and switch 63. A switch 77, similar to switch 75, but positioned in line 76, is connected to switch 52 and is controlled by solenoid 80. It is within the contemplation of this invention to provide a control means for solenoids 80 and 81 whereby the solenoids cannot be actuated at the same time.

In operation, assuming that solenoid 80 is energized to close switches 52 and 77, the automatic temperature control is connected to the DC control windings of the saturable reactor and the output of the oscillator is controlled by the speed of the tube and the temperature at the welding point. To change from the automatic control to the manual control, switch 73 is closed which places load 70 across the lines 61 and 62 so the current reading of a gauge 79 will indicate the current impressed on the load 70. This is compared to the reading of a meter 78 indicating the current directed to the saturable reactor and the manual device (not shown) is adjusted until the current indication by meter 79 corresponds to the current indication of meter 78. When this is accomplished, solenoid 80 is released and solenoid 81 is energized to connect the manual temperature control system through the DC windings of the saturable reactor. Thus, a smooth transition from the automatic control to the manual control is provided and the output of the oscillator does not change. Generally, the same arrangement is used to change from the manual control to the automatic control. When making this change, the amplifier 10 is trimmed to produce a current through load 70 corresponding to the current indicated by meter 79.

Various changes and modifications may be made without departing from the spirit and scope of the invention as defined in the depending claims.

Having thus described my invention, I claim:
1. An automatic temperature control adapted to control the power of an inductor in accordance with the speed of a workpiece, comprising a first means for supplying power to the inductor, a second means for controlling said first means to vary the power output to the inductor, a speed sensing device to control said second means in accordance with the speed of the workpiece, the improvement comprising: said speed sensing device having a voltage pickup movable in response to a change in workpiece speed, a voltage divider, a plurality of shunting circuits along the length of the divider, and a standard control voltage across said divider, said shunting circuits having electrical resistance to control the voltage drop per length along the voltage divider.

2. The improvement of claim 1 wherein said shunting circuits each comprise a shunt leg in parallel with a portion of the voltage divider.

3. The improvement as defined in claim 2 wherein said shunt leg has a means for varying the electrical resistance of said shunt leg.

4. An automatic temperature control adapted to control the power of an inductor in accordance with the speed of the workpiece, comprising a first means for supplying power to the inductor, a second means for controlling said first means to vary the power output to the inductor, a speed sensing device to control said second means in accordance with the speed of the workpiece, the improvement comprising: said speed sensing device having a standard voltage, a voltage divider, said standard voltage impressed across said divider, a means movable in response to changes of workpiece speed for contacting said divider to direct a portion of said standard voltage to the second means, and compensating means for changing the voltage drop across sections of the divider.

5. The improvement as defined in claim 4 wherein said compensating means comprises a shunt circuit across each of said sections, said shunt circuit including an electrical resistance element.

6. The improvement as defined in claim 4 wherein said compensating means comprises a shunt circuit across each of said sections, said shunt circuit including a potentiometer.

7. An automatic control for a tube welding apparatus comprising means for supplying high frequency electrical welding currents to said tube, current control means for increasing and decreasing said currents, and means controlled by the linear speed of said tube as it is being welded for regulating said current control means, said regulating means varying said currents supplied to said tube in a predetermined non-linear relationship with respect to variations in the linear speed of said tube.

8. An automatic control for a tube welding apparatus comprising means for supplying high frequency welding currents to said tube, current control means for increasing and decreasing said currents, means responsive to the linear speed of said tube being welded, and means controlled by said speed responsive means for regulating said current control means to increase and decrease said currents in a predetermined non-linear relationship with increases and decreases, respectively, of said linear speed of said tube.

9. An automatic control for a tube welding apparatus comprising means for supplying high frequency electric welding currents to said tube, current control means for increasing and decreasing said currents, means responsive to the linear speed of said tube being welded, and non-linear network means controlled by said speed responsive means for regulating said current control means to increase and decrease said currents in a predetermined non-linear relationship with increases and decreases, respectively, of said linear speed of said tube.

10. An automatic temperature control adapted to control the power of a device for directing high frequency welding currents to the converging edges of a metal skelp in a tube mill, said control comprising a first means for supplying power to said device, a second means for controlling said first means to vary the power output of said device, a speed sensing device to control said second means in accordance with the speed of said skelp, the improvement comprising: said speed sensing device having a standard voltage, a voltage divider, said standard voltage impressed across said divider, means movable in response to changes of workpiece speed for contacting said divider to direct a portion of said standard voltage to said second means, and compensating means for changing the voltage drop across sections of said divider.

References Cited
UNITED STATES PATENTS

| | | | |
|---|---|---|---|
| 1,862,487 | 6/1932 | Wensley | 323—74 |
| 2,704,326 | 3/1955 | Whitson et al. | 317—5 |
| 2,785,260 | 3/1957 | Matthew | 323—74 |
| 3,053,095 | 9/1962 | Koril et al. | 317—5 |
| 3,145,285 | 8/1964 | Kohler | 219—59 |
| 3,243,566 | 3/1966 | Sim et al. | 219—60 |
| 3,261,960 | 7/1966 | Lehnert | 219—60 |

RICHARD M. WOOD, *Primary Examiner.*